March 14, 1944.   A. G. LAUCK   2,344,464
REVOLVING POT FOR GLASSWARE MANUFACTURE
Filed July 16, 1942
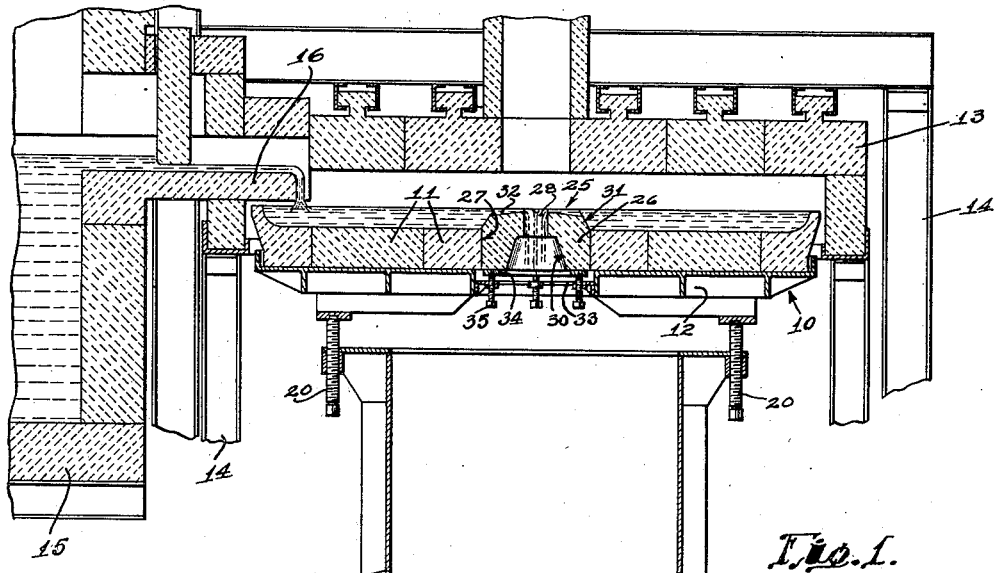
Fig. 1.
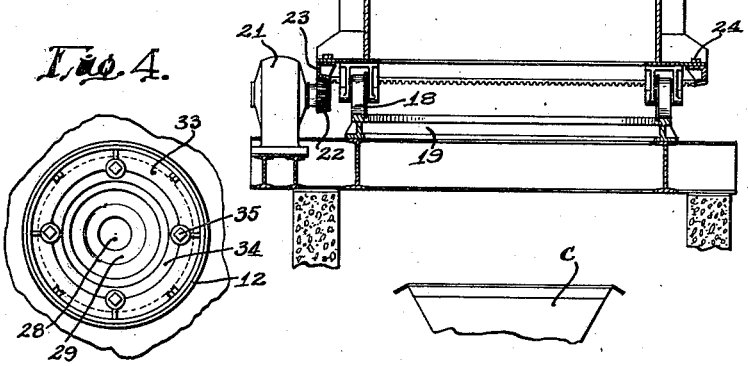
Fig. 4.
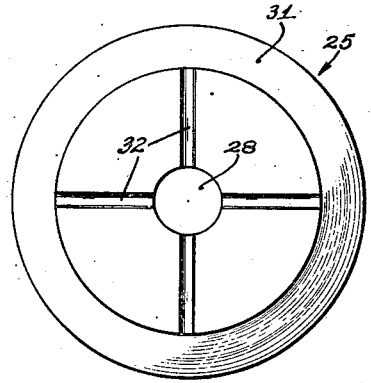
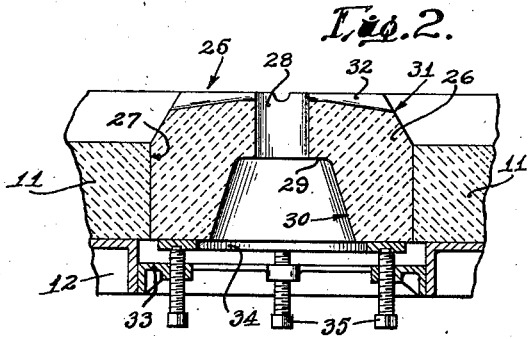
Fig. 2.
Fig. 3.
INVENTOR
ALBERT G. LAUCK
BY Rule & Hoge
ATTORNEYS Patented Mar. 14, 1944

2,344,464

UNITED STATES PATENT OFFICE 2,344,464

REVOLVING POT FOR GLASSWARE MANUFACTURE

Albert G. Lauck, Alton, Ill., assignor to Owens-Illinois Glass Company, a corporation of Ohio Application July 16, 1942, Serial No. 451,149

7 Claims. (Cl. 49—56)

My invention relates to improvements in revolving pots for use in the manufacture of articles of glassware, such pots being adapted to contain a supply body of molten glass from which mold charges are gathered by suction at regular time intervals and transformed into containers.

The glass which is gathered by the molds of a forming machine, is very largely that portion at and in close proximity to the surface of the supply body. Very often and particularly with amber glass, blisters, seeds, and the like, form upon the surface and too frequently find their way into the finished containers. These, if sufficiently large and numerous, produce defects in the ware, which prohibit commercial use and marketing thereof. Skimmers and various devices have been employed to move these blisters, seeds, etc., away from the "gathering area" and inwardly toward the center of the pot in order to prevent their being gathered with the mold charges.

An object of my invention is the provision of novel and effective means for completely removing these blisters, seeds, etc., from the supply body while avoiding the necessity for using skimmers or other devices which very obviously chill the surface glass and make it necessary to reheat those portions prior to their being brought to the gathering area. To this end my invention contemplates the embodiment in the revolving pot structure of novel means for draining the surface glass from the supply body and permitting it to flow by gravity through a central, or axial discharge passageway, such discharged glass flowing in several streams into a "cullet buggy" positioned therebelow.

Another object of my invention is the provision of means of the above character in the form of a readily removable insert which may also be adjusted vertically with respect to the revolving pot for the purpose of regulably controlling the flow of glass from the supply body and the depth of the body of glass.

Other objects will be in part apparent and in part pointed out hereinafter.

In the drawing:

Fig. 1 is a vertical sectional elevational view of a revolving pot unit illustrating my invention in conjunction therewith;

Fig. 2 is a fragmentary detail sectional view of the center drain unit constituting my invention;

Fig. 3 is a top plan view thereof; and

Fig. 4 is a bottom plan view.

The revolving pot unit with which my invention is illustrated, comprises a pot 10 formed of suitable refractory blocks 11 supported upon a casting 12 and enclosed by a housing 13 of any conventional form. Steel frame members 14 support the housing in proximity to the glass melting furnace 15 from which molten glass flows into the pot by way of the usual trough 16, or spout.

The casting 12 which supports the blocks making up the revolving pot, is adjustably mounted upon a vertical cylinder 17 which in turn carries flanged supporting wheels 18 riding upon a circular track 19, said track, cylinder, and revolving pot having coincident axes. Jack screws 20 carried by the upper end of the cylinder 17 provide for vertical relative adjustment of the pot and cylinder, such adjustment being advantageous for many obvious reasons, foremost among which is proper elevation of the revolving pot with respect to the gathering molds (not shown). Rotation of the cylinder and therefore the revolving pot is obtained by means of an electric motor 21, or the like, which is operatively connected to the lower end of the cylinder 17 by means of a bevel gear 22 running in mesh with a bevel ring gear 23, the latter being removably attached to said cylinder by bolts 24, or similar fasteners. The cullet buggy C is positioned in proximity to the lower end of the cylinder 17 as shown.

The center drain block or insert 25, comprises a circular refractory block 26 which fits into a central opening 27 in the floor of the pot 10 and is formed with an axial vertical discharge outlet 28 or passageway. This outlet 28 may well be of uniform cross-sectional area from the upper end of the block to a point substantially midway of the length thereof, at which point the opening is enlarged providing a radial shoulder 29 and from this shoulder is flared to the lower end of the block as indicated at 30. The upper end 31 of the block is tapered from a point substantially at the upper surface of the pot floor. The extreme upper end of the insert is generally flat, or horizontal and provided with an annular series of radial channels 32 which establish communication between the discharge outlet 28 and the interior of the pot proper.

Proper positioning and vertical adjustment of the insert 25 in the pot opening is obtained by means of a supporting ring 33 which is suitably attached to the pot casting 12 and a ring 34 which supportingly engages the lower end of said block, said rings being adjustably spaced apart by jack screws 35 which are carried by the lower ring 33.

With the construction above described, it will be obvious that proper setting of the insert 25 in the revolving pot will insure radially inward flowing of surface glass and with it, the blisters, seeds, etc., such glass upon reaching the block being divided into several streams which individually flow through the outlet opening 28 and thence downwardly through the cylinder 17 and into the cullet buggy C. If desired, a stream, or spray, of water may be applied to the flowing streams of glass to break up and cool the glass as it falls into the cullet buggy.

Modifications may be resorted to within the spirit and scope of the appended claims.

I claim:

1. In combination, a revolving pot mounted for rotation about a vertical axis, said pot including a bottom and upstanding marginal rim, said bottom having an axial opening, and an insert arranged in and filling said opening and having a central vertical outlet passageway therethrough, said insert extending upwardly into the pot to a point substantially in the plane of the upper surface of said rim and provided with radial overflow channels in its upper face extending from the passageway to the periphery of the insert to conduct surface glass to the former.

2. In combination, a revolving pot mounted for rotation about a vertical axis, said pot including a bottom and upstanding marginal rim, said bottom having an axial opening, an insert arranged in and filling said opening and having a central vertical outlet passageway therethrough, said insert extending upwardly into the pot to a point substantially in the plane of the upper surface of said rim and provided with radial overflow channels in its upper face extending from the passageway to the periphery of the insert to conduct surface glass to the former, and a support for the insert arranged beneath the latter and including an annular series of screws for adjusting the insert vertically and supporting it in any adjusted position.

3. In combination, a revolving pot mounted for rotation about a vertical axis, said pot including a bottom and upstanding marginal rim, said bottom having an axial opening, and an insert arranged in and filling said opening and having a central vertical outlet passageway therethrough, said insert extending upwardly into the pot and provided with radial overflow channels in its upper face extending from the passageway to the periphery of the insert to conduct surface glass to the former, said passageway being of uniform cross-sectional area in proximity to the channels and flared below the terminus of the zone of uniform cross-sectional area.

4. In combination, a revolving pot mounted for rotation about a vertical axis, said pot including a bottom and upstanding marginal rim, said bottom having an axial opening, and an insert arranged in and filling said opening and having a central vertical outlet passageway therethrough, said insert extending upwardly into the pot and provided with radial overflow channels in its upper face extending from the passageway to the periphery of the insert to conduct surface glass to the former, said passageway being of uniform cross-sectional area in proximity to the channels and flared below the terminus of the zone of uniform cross-sectional area, there being an internal radial shoulder at the upper end of the flared area.

5. In combination, a revolving pot mounted for rotation about a vertical axis, said pot including a bottom and upstanding marginal rim, said bottom having an axial opening, an insert arranged in and filling said opening and having a central vertical outlet passageway therethrough, said insert extending upwardly into the pot and provided with radial overflow channels in its upper face extending from the passageway to the periphery of the insert to conduct surface glass to the former, and a support for said insert including vertically spaced rings, one ring being carried by the insert and the other attached to the pot and vertical adjusting screws carried by said other ring and bearing against the uppermost ring.

6. In combination, a revolving pot mounted for rotation about a vertical axis, said pot including a bottom and upstanding marginal rim, said bottom having an axial opening, an insert arranged in and filling said opening and having a central vertical outlet passageway therethrough, said insert extending upwardly into the pot and provided with radial overflow channels in its upper face extending from the passageway to the periphery of the insert to conduct surface glass to the former, and an open vertical cylinder arranged below and connected to the pot and means for rotating the cylinder about its axis.

7. In combination, a revolving pot mounted for rotation about a vertical axis, said pot including a bottom and upstanding marginal rim, said bottom having an axial opening, an insert arranged in and filling said opening and having a central vertical outlet passageway therethrough, said insert extending upwardly into the pot and provided with radial overflow channels in its upper face extending from the passageway to the periphery of the insert to conduct surface glass to the former, an open vertical cylinder arranged below and connected to the pot and means for rotating the cylinder about its axis, and jack screws adjustably connecting said cylinder and pot.

ALBERT G. LAUCK.